United States Patent [19]

Tung et al.

[11] Patent Number: 4,681,823

[45] Date of Patent: Jul. 21, 1987

[54] LITHIUM/FLUORINATED CARBON BATTERY WITH NO VOLTAGE DELAY

[75] Inventors: Hsueh S. Tung, Williamsville; David J. Friedland, Snyder; Bernard Sukornick, Williamsville, all of N.Y.; Lynn E. McCurry, Los Alamos, N. Mex.; Richard E. Eibeck, Orchard Park; George D. Lockyer, Clarence Center, both of N.Y.

[73] Assignee: Allied Corporation, Morris Township, Morris County, N.J.

[21] Appl. No.: 864,242

[22] Filed: May 19, 1986

[51] Int. Cl.$^4$ .................. H01M 4/08; H01M 4/36; H01M 6/16

[52] U.S. Cl. ................. 429/218; 252/182.1; 570/150

[58] Field of Search ............. 429/194, 197, 218; 252/182.1; 570/150

[56] References Cited

U.S. PATENT DOCUMENTS

| | | |
|---|---|---|
| 3,700,502 | 10/1972 | Watanabe et al. ............... 429/218 |
| 3,796,605 | 3/1974 | Dechenaux et al. ............. 429/197 |
| 4,105,836 | 8/1978 | Almerini ........................... 429/194 |
| 4,166,888 | 9/1979 | Rao et al. ......................... 429/194 |
| 4,247,608 | 1/1981 | Watanabe et al. ............... 429/194 |
| 4,271,242 | 6/1981 | Toyoguchi et al. .............. 429/194 |
| 4,548,881 | 10/1985 | Naleqajek et al. ................ 429/194 |
| 4,593,132 | 6/1986 | Kita et al. ........................ 570/150 |

FOREIGN PATENT DOCUMENTS 0584369 12/1977 U.S.S.R. ............................. 429/194

*Primary Examiner*—Donald L. Walton
*Attorney, Agent, or Firm*—Jay P. Friedenson

[57] ABSTRACT

A process is disclosed for producing fluorinated carbon ($CF_x$) admixed which can be used in a lithium battery to eliminate low voltage at the beginning of discharge. The process uses a thick carbon bed to assure proper degree and type of underfluorination of the $CF_x$. The inhomogeneous fluorinated carbon produced is a fully, or overfluorinated $CF_x$ with a small amount of underfluorinated material to eliminate voltage suppression in Li/$CF_x$ batteries.

9 Claims, 9 Drawing Figures

LITHIUM/FLUORINATED CARBON BATTERY WITH NO VOLTAGE DELAY

FIELD OF THE INVENTION

The present invention relates to an improved fluorinated carbon ($CF_x$) useful in the manufacture of batteries. More particularly, the invention relates to a novel essentially single step process for producing $CF_x$ which can be used in a lithium battery to eliminate low voltage at the beginning of discharge. The process in which a thick carbon bed is used to assure proper degree and type of inhomogeneity yields a product which is a fully-, or overfluorinated $CF_x$ admixed with a small amount of underfluorinated material to elminate voltage suppression in the battery performance.

BACKGROUND OF THE INVENTION

Fluorinated carbon is known by the formula $(CF_x)_n$, where x is a number between 0 and 1.5 and n is an indefinite number greater than 2. Hereafter, $(CF_x)_n$ is abbreviated as $CF_x$. Fluorinated carbon is ordinarily obtained by fluorinating a crystalline or amorphous carbon with elemental fluorine gas at elevated temperature. One of the major applications of the fluorinated carbon is a cathode active material in a lithium, i.e., $Li/CF_x$, battery. This $Li/CF_x$ battery shows many advantages over other types of lithium batteries. The advantages include high energy density, flat discharge curve and long shelf life., etc. However, there is a characteristic voltage delay at the initial discharge stage. This voltage delay adversely impacts its applications.

Numerous disclosures have been made in the prior art with the aim of proving the initial discharge voltage of the lithium/fluorinated carbon batteries. Some of these prior art efforts to eliminate or reduce initial voltage suppression are summarized as follows:

The following Japanese unexained patent applications disclose the addition of a fluorinated carboneous materials to the $CF_x$ to reduce or elminate the initial voltage delay.

Japanese Kokai No. 83 05,967 discloses the addition of a fluorinated carbon black made from a starting carbon black having a specific surface area of 800 m²/g;

Japanese Kokai No. 82 84,570 discloses the use of a mixture of 10 to 50 wt. % of polydicarbon monofluoride, $(C_2F)_n$, and the $CF_x$ to elminate the initial voltage delay;

Japanese Kokai No. 84 31,564 discloses the use of carbon containing adsorbed fluorine in the $CF_x$ electrode to replace the carbons which are typically used to provide the electrical conductivity of the electrode matrix; and Japanese Kokai No. 82 206,057 discloses the incorporation of a $AlF_3$ or $MgF_2$ and $F_2$ intercalated graphite fluoride ternary compound into a $CF_x$ cathode to improve the initial discharge voltage.

The following Japanese patent publications disclose the use of a variety of materials which do not contain fluorine and are indicated as having the capability to elminate or reduce the severity of voltage suppression in $Li/CF_x$ cells;

Japanese Kokai No. 83 123,663 discloses the addition of aluminum powder;

Japanese Kokai No. 83 206,058 discloses the addition of aluminum fiber to $CF_x$ cathode compositions for the purporse of stabilizing the initial discharge voltage; and Japanese Kokai No. 83 161,260 disclosed the addition of compounds of the form $Cr_xO_y$ where $15 < y/x < 3$. Examples given are $Cr_3O_6$ and $Cr_2O_5$. These additives are claimed to improve the initial drop in cell voltage.

The following references disclose miscellaneous efforts to alter the discharge voltage such as by chemical pretreatment, electrochemical predischarge, etc.

Japanese Kokai No. 84 87,762 discloses defluorination of over-fluorinated $CF_x$ by using aqueous HI solution in the presence of methanol can improve the initial discharge characteristics;

Japanese Kokai No. 84 86,155 discloses the UV irradiation of $CF_x$ in the NaOH/MeOH solution to reduce the initial voltage delay;

Japanese Kokai No. 77 10,519 discloses the use of a $CF_x$ with high free oxidizing power, which has a deleterious effect on the shelf life of the $Li/CF_x$ battery;

Japanese Kokai No. 83 140,972 discloses the use of a fluorinated carbon obtained from fluorinating a mixture of graphite or petroleum coke with a cabon black having a surface area $\geq 800$ m²/g;

Japanese Kokai No. 80 31,991 discloses the use of a $CF_x$ obtained by subsequent refluorination of a pulverized $CF_x$ of large particle size (200 mesh) for the purposes of improving the initial discharge characteristics; and Japanese Kokai No. 82 124,865 discloses that $Li/CF_x$ batteries can be partially discharged to less than 10% of the battery capacity to improve the initial discharge voltage. This practice minimizes the voltage delay but suffers from several disadvantages; an additional step is required in the production process, processing time is increased, and additional equipment is required.

Each of the foregoing approaches suffers from one or more disadvantages from the standpoint of, for example, economy, practicality and complexity. Therefore, a need exists for a process to prepare a fluorinated carbon with no initial voltage delay upon discharge in a $Li/CF_x$ battery and free of the aforementioned drawbacks of free oxidizing power.

SUMMARY OF THE INVENTION

In accordance with the present invention, we have discovered a single step process to make a $CF_x$ without initial voltage delay which occurs in the discharge of $Li/CF_x$ battery. In the practice of the process of the invention, a thick carbon bed in a static bed reactor is used to assure that the proper degree and type of underfluorinated $CF_x$ is admixed with fully- or overfluorinated material. The fluorination tie is controlled to give the right amount of inhomogeneity of the $CF_x$ product. These process conditions can apply to fluorination of either crystalline or amorphous carbon. The amorphous carbon, particularly petroleum coke, is the preferred starting material because it gives a fluorinated carbon with much lower free oxidizing power than that from a crystalline carbon. The free oxidizing power adversely affects the shelf life of $Li/CF_x$ battery.

The fluorinated carbon produced from the single step process in accordance with the invention when incorporated in a battery will not require pre-discharging of the battery to elinate the initial voltage suppression. In addition, the process obviates the multistep operations such as blending of different material(s) with $CF_x$ or carbon before fluorination, chemical pretreatment of $CF_x$, prefluorination followed by pulverization, etc. which various prior art techniques entail.

BRIEF DESCRIPTION OF THE DRAWING

FIGS. 7(a) and (b)

DESCRIPTION OF THE PREFERRED EMBODIMENT OF THE INVENTION

In accordance with the invention, fluorinated carbon having the property of obviating initial voltage delay can be prepared by a single step process by the use of a thick bed depth and control of the fluorination time; a static bed reactor is employed. Fluorination e is controlled so that a proper degree and type of inhomogeneity is obtained. Such inhomogeneity is observed as color distribution through the profile of $CF_x$ layer in the vertical direction after fluorination. The color of $CF_x$ reflects the degree of fluorination, with a white color indicating a fully fluorinated carbon $(CF_x)$ wherein the value of x in the formula $CF_x$, is greater than 1.0. A gray color indicates a $CF_x$ with x approximately equal to 0.9. The color changes gradually from gray to black as the x value decreases. The $CF_x$ appears with a brownish tone when a crystalline carbon is used as starting material. In selecting the carbon powder for use in the process of the invention, the powder should have a micron size of less than 150 microns and preferably less than 30 microns.

When petroleum coke powder is used as starting material, a minum bed depth of 1 cm is required. For fluorination at 380° C., the reaction time is controlled to give a weight increase of 117% corresponding to approxately 54%F. The color of $CF_x$ on the surface of the $CF_x$ layer is uniforly white. This color persists through two thirds of the bed depth. The color in the bottom third of the bed changes gradually from white to gray and is alost black at the bottom. This product gives no initial voltage delay when used as a cathode active material in a $Li/CF_x$ battery.

In general, the weight gain of the carbon resulting from the fluorination of the carbon, in accordance with the invention, is at least 10 percent and more appropriately at least about 50 percent. Preferably, the weight gain should be of the order of from about 100 to 140 percent.

Figure 1:
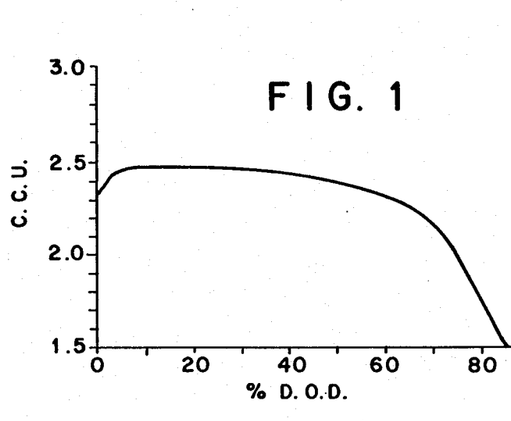
FIG. 1 shows a discharge curve of the commercially available $CF_x$ illustrating a relatively substantial suppression at the initial part of the discharge of $Li/CF_x$ battery.

As illustrated by the drawing, FIG. 1 shows the discharge curve of a comercially available fluorinated carbon illustrating the typical initial discharge characteristics. It has a 130 mV voltage suppression at an approxate discharge rate of 2.4 $mA/cm^2$.

Figure 2:
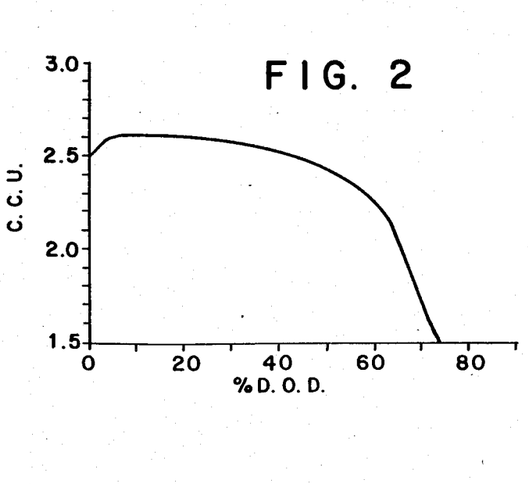
FIGS. 2, 3 and 4 illustrate the effect of bed depth on the initial discharge characteristics of a coke-based $CF_x$.
Figure 3:
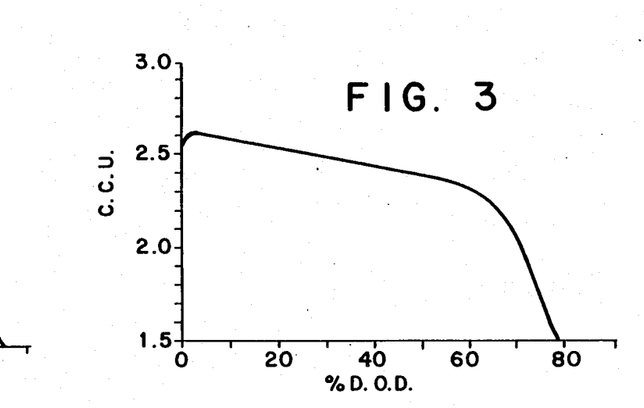
Figure 4:
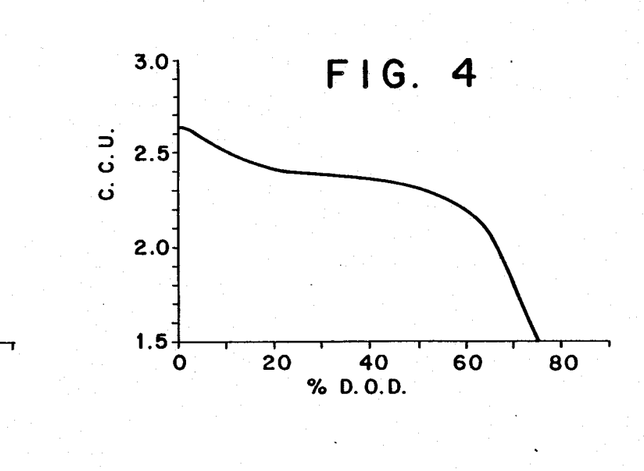

The effect of the depth of the carbon layer is illustrated in FIGS. 2, 3 and 4. FIG. 2 shows the discharge curve of fluorinated carbon with 54%F made from petrolum coke powder in a bed 0.5 cm thick. An initial voltage suppression of about 120 mV is obsered. When the bed depth is increased to 0.65 cm, the voltage-delay is reduced substantially although not completely elinated. The discharge curve shown in FIG. 3 becomes more sloping. When the bed depth is increased to 1 cm, the initial voltage suppression is completely eliminated. This is shown by the discharge curve of the fluorinated carbon shown in FIG. 4.

Figure 5:
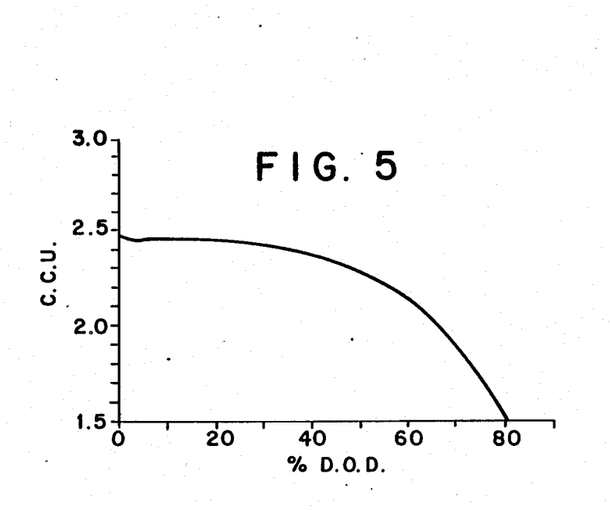
FIG. 5 shows a discharge curve of mixture A of Table 1.
Figure 6:
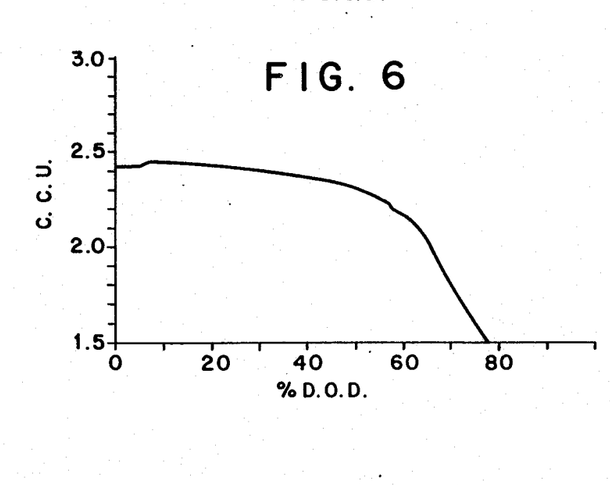
FIG. 6 shows a discharge curve of mixture B of Table 1.

The proper degree of inhomogeneity resulting from the increase of carbon bed depth is essential for producing a $CF_x$ with no initial voltage suppression upon discharge of a $Li/CF_x$ battery. In order to demonstrate the nature and effect of inhomogeneity, study of blending several $CF_x$'s with different x value was conducted. Underfluorinted $CF_x$'s with x-value ranging fro 0.14 to 0.46 were used. Table 1 shows the different weight percent of the underfluorinated $CF_x$'s used in mixtures of A and B. The bulk material, $CF_{1.0}$ (80% by weight) has initial discharge characteristics as shown in FIG. 1. However, in the discharge curve of mixture A shown in FIG. 5, the initial voltage suppression is alost completely elinated. In mixture B, with $CF_{0.23}$ and $CF_{0.35}$ omitted, the initial voltage suppression as shown in FIG. 6 is substantially minized but not elinated. The results indicate that a mixture of different components of $CF_x$'s with different x-values is required to eliminate initial voltage suppression. This type of mixture or inhomogeneity is adequately supplied by the fluorinated carbon obtained by the process of the invention.

Figure 7:
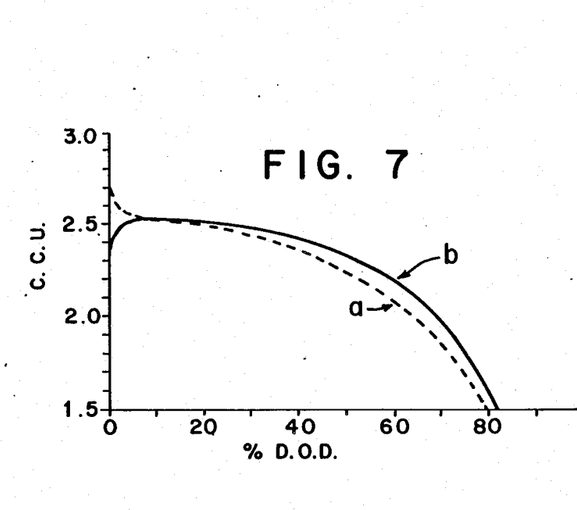
FIG. 7(a) is the discharge curve of a $CF_x$ made from a crystalline carbon in accordance with the process conditions of this invention.
FIG. 7(b) is the discharge curve of a $CF_x$ made fro the same starting carbon of 7(a) without controlling the reaction time.

In the case of crystalline carbon, the $CF_x$ with no initial voltage delay is easier to obtain than from petroleum coke. A relatively thin bed depth can provide the required inhomogeneity. FIG. 7(a) shows a discharge curve of a fluorinated carbon prepared by fluorinating a 0.5 cm thick bed of crystalline carbon at 460° C. Again, the reaction time is controlled to give a non-homogeneous $CF_x$. The color distribution in the static bed reactor after fluorination is similar to that made from petroleum coke. Brownish white $CF_x$ appears across the bed uniformly. This brownish white color persists through half of the bed depth and then changes from brownish gray to black in the bottom half of the $CF_x$ layer. Fluorination of the same material under the same conditions with prolonged reaction te gives a $CF_x$ with a noral voltage delay at the initial stage. The discharge curve of this $CF_x$ is shown in Curve "b" FIG. 7. A characteristic initial voltage suppression is observed.

Figure 8:
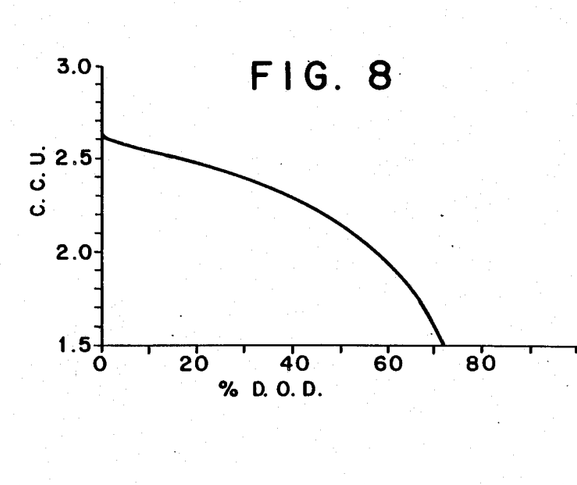
FIG. 8 shows the discharge curve of the same material of that in FIG. 7(a) after ethanol-wash.

Because of the nature of crystalline carbon, the fluorinated carbon produced from this material at 460° C. has high free oxidizing power. However, the free oxidizing power can be minimized by washing with 95% ethanol. FIG. 8 shows the discharge curve of the material giving the discharge curve "a" of FIG. 7 washed with 95% ethanol in a Soxhlet extractor for 5 days. The high front end voltage disappears without introducing a voltage suppression. The high front end voltage is mainly due to the adsorbed fluorine which caused the high free oxidizing power.

Figure 9:
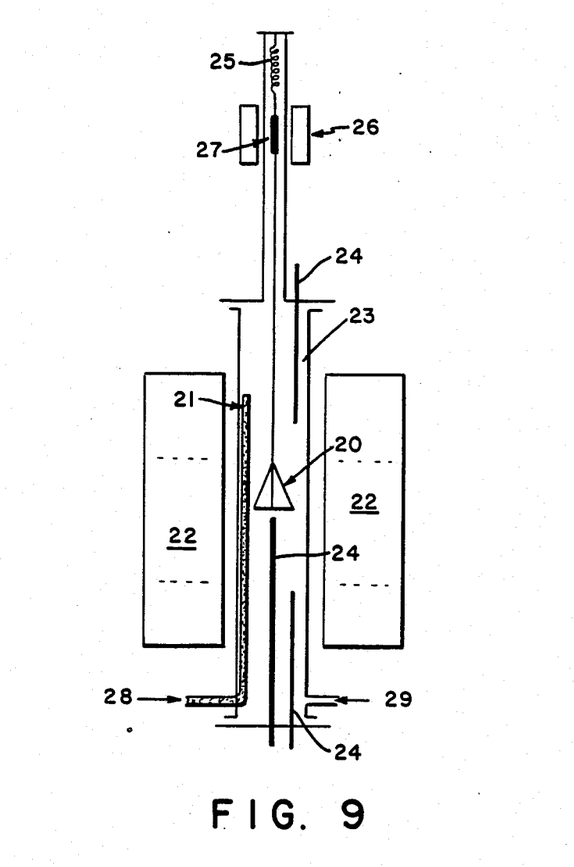
FIG. 9 is a schematic diagram of a fluorination reactor which may be used in preparing the fluorinated carbon in accordance with the invention.

The nature of the reaction apparatus of a kind which may be used to produce the fluorinated carbon in accordance with the process of the present invention will be described with reference to FIG. 9 of the drawing. FIG. 9 illustrates a thermobalance device. The thermobalance is a type of static bed reactor where starting carbon is contained in a 2" or 3" diameter nickel pan 20. The fluorine gas diluted with nitrogen is fed to the unit at 28 and is brought to the top of the reactor by a tube inside the reactor. The fluorine and nitrogen gas mixture flows in a direction perpendicular to the sample pan 20. The reactor temperature is maintained by a three-zone tube furnace 22 surrounding the 4" diameter monel reactor 23 with three internal sensing thermocouples 24. A as outlet is shown at 29.

As the fluorination proceeds, the weight of sample as it accepts fluorine increases. A spring 25 and a displacement transducer 26 with core 27 is used to monitor the weight gain during fluorination. Reaction conditions determined in the thermobalance essentially can be translated directly to a large scale static bed reactor.

The underfluorinated fluorinated carbon materials indicated in Table 1 are prepared in a horizontal tube reactor a known device which generally comprises a 1" monel pipe, and 1½" tube furnace and a nickel boat (2 ½"×½"). The sample is contained in the nickel boat which is placed in the center of the tube reactor. Teperature used to control the reactor is sensed by a thermocouple inserted underneath the nickel boat. The fluorine and nitrogen gas mixture flows in a direction parallel to the sample surface.

The invention will be further described by the following specific examples. It should be understood, however, that although these examples may describe in detail certain preferred operating conditions of the invention they are given primarily for purposes of illustration and the invention in its broader aspects is not limited thereto.

EXAMPLE 1

Petroleum coke powder with a median particle size of 7 microns was used to prepare fluorinated carbons, the product derived, gave discharge curve shown by FIG. 2.

A five grams of carbon powder were evenly distributed on the nickel pan to give 0.5 cm bed depth in a 3" diameter nickel pan in the thermobalance. After the sample was loaded, the reactor temperature was increased to 200° C. under a steady stream of nitrogen gas. Then, fluorine gas was introduced as the reactor temperature was radually increased to 370°–380° C. A total flow rate of 150 cc/min. of gas mixture was used with a 15 vol. % $F_2$. The weight gain of the sample was monitored throughout the reaction. The reaction was terminated at approxately 115 to 120% weight gain, corresponding to 53 to 55% of total combined fluorine in $CF_x$.

EXAMPLE 2

The procedure and conditions as in Example 1 were employed, except a 2" diameter sample pan was used to provide a bed depth of 0.65 cm. The discharge curve of the fluorinated carbon derived is shown in FIG. 3.

EXAMPLE 3

The procedure and conditions as in Example 2 were employed except a greater quantity, i.e., nine grams of carbon powder was used which gave a carbon bed depth of 1 cm. The discharge curve of this $CF_x$ is shown in FIG. 4.

EXAMPLE 4

Pulverized crystalline carbon (available as Desulco frcm Superior Graphite Corporation) with a median particle size of 5 microns was used to produce $CF_x$'s giving discharge curves (a) and (b) in FIG. 7. Five grams of starting carbon ws used in both cases in the thermobalance to give a bed depth of 0.5 cm. The reaction was run at 460° C. with 15 vol. % $F_2$ and a total flow rate of 150 cc/min. of the $N_2$/$F_2$ mixture. The $CF_x$ in FIG. 7(a) was obtained by terminating the reaction at approximately 100–110% weight gain. The reaction producing the material in FIG. 7(b) was completed when weight gain leveled off. The total weight gain was ately 120–130%.

EXAMPLE 5

The five underfluorinated fluorinated carbon materials listed in Table 1 were prepared in a horizontal tube reactor. In a typical run, one gram of the petroleum coke powder was used. A total flow rate of 50 cc/min. of fluorine and nitrogen (15 vol. % $F_2$) was used at 350° C. Fluorinated carbon products with xvalue from 0.14 to 0.46 were obtained by using different reaction time, ranging from 1 to 5 hours respectively.

TABLE 1

| MIXTURE OF SEVERAL DIFFERENT X-VALUE $CF_x$'S WITH $CF_{1.0}$ | | |
|---|---|---|
| | MIXTURE | |
| $CF_x$ | A | B |
| $CF_{.14}$ | 4% | 8% |
| $CF_{.23}$ | 4% | — |
| $CF_{.26}$ | 4% | 4% |
| $CF_{.35}$ | 4% | — |
| $CF_{.46}$ | 4% | 8% |
| $CF_{1.0}$ | 80% | 80% |

EXAMPLE 6

In a typical battery test, one gram of fluorinated carbon was used to mix with 12 wt. % of Shawinigan black obtainable commercially from Gulf Oil Chemical Co. and 3 wt. % of PTFE (polytetrafluoroethylene). Shawinigan Black is used as a conducting carbon, whereas PTFE is a binder. The homogenized mixture was pressed into a cathode pellet sealed into cell with excess aount of lithium foil as an anode and a polypropylene separator. An organic mixture of propylene carbonate and dimethoxy ethane (50/50) with 1M $LiBF_4$ was used as an electrolyte. The battery was discharged across a constant 1 Kohm load. The current density at 50% depth of discharge was approximately 2.4 mA/cm².

It will be understood that variations may be made in the details disclosed for illustrative purposes herein and therefore the invention, except as expressed in the claims, is not to be limited to such details.

What is claimed is:

1. A method for producing an improved fluorinated carbon, for use as a cathode active material in a lithium fluorinated carbon battery, which inhibits initial voltage delay upon discharge, which comprises:
   (a) introducing a comminuted carbon into a static bed reactor;
   (b) foring a bed of said carbon to a depth of at least 0.5 cm; and
   (c) subjecting said carbon bed to a fluorination reaction under controlled reaction time with fluorine to produce an inhomogeneous fluorinated carbon product and until the carbon attains a weight gain of at least 10 percent.

2. The method of claim 1 wherein the fluorination in step (c) is maintained until the carbon attains a weight gain of from about 100 to about 140 percent.

3. The method of claim 1 in which the carbon employed is selected from amorphous or crystalline carbon.

4. The method of either claim 1 or claim 3 wherein the carbon comprises a petroleum coke.

5. The method of any of claim 1 through 3 in which the carbon has a median particle size less than 30 microns.

6. The method of claim 1 wherein the fluorination is conducted at a teperature between 320-600° C.

7. The method of claim 1 wherein the fluorinated product is washed with ethanol.

8. A $Li/CF_x$ battery comprising the reaction product produced by the method of claim 6 in admixture with a fluorinated carbon having a different initial discharge characteristic.

9. A $Li/CF_x$ battery comprising the reaction product produced by the method of claim 7 in admixture with a fluorinated carbon having a different initial discharge characteristic.

* * * * *

UNITED STATES PATENT AND TRADEMARK OFFICE
CERTIFICATE OF CORRECTION

PATENT NO. : 4,681,823
DATED : July 21, 1987
INVENTOR(S) : Tung et al.

It is certified that error appears in the above-identified patent and that said Letters Patent is hereby corrected as shown below:

In the Abstract, line 2 of the Patent, delete "admixed".

In the Abstract, line 8 of the Patent, after "$CF_x$"; insert --admixed--.

In the Specification, Column 1, line 34 of the Patent, delete "proving"; substitute therefore --improving--.

In the Specification, Column 1, line 56 of the Patent, delete "F2"; substitute therefore --$F_2$--.

In the Specification, Column 2, line 51 of the Patent, delete "tie"; substitute therefore --time--.

In the Specification, Column 2, line 63 of the Patent, delete "elinate"; substitute therefore --eliminate--.

In the Specification, Column 3, line 13 of the Patent, delete "(b)"; substitute therefore --(b). --.

In the Specification, Column 3, line 16 of the Patent, delete "fro"; substitute therefore --from--.

In the Specification, Column 3, line 31 of the Patent, delete "e"; substitute therefore --time--.

In the Specification, Column 3, line 48 of the Patent, delete "minum"; substitute therefore --minimum--.

UNITED STATES PATENT AND TRADEMARK OFFICE
CERTIFICATE OF CORRECTION

PATENT NO. : 4,681,823

DATED : July 21, 1987

INVENTOR(S) : Tung et al.

It is certified that error appears in the above-identified patent and that said Letters Patent is hereby corrected as shown below:

In the Specification, Column 3, line 52 of the Patent, delete "uniforly"; substitute therefore --uniformly--.

In the Specification, Column 3, line 55 of the Patent, delete "alost"; substitute therefore --almost--.

In the Specification, Column 3, line 68 of the Patent, delete "approxate"; substitute therefore --approximate--.

In the Specification, Column 4, line 4 of the Patent, delete "petrolum"; substitute therefore --petroleum--.

In the Specification, Column 4, lines 7 and 8 of the Patent, delete "elii-nated"; substitute therefore --eliminated--.

In the Specification, Column 4, line 19 of the Patent, delete "fro"; substitute therefore --from--.

In the Specification, Column 4, line 25 of the Patent, delete "alost"; substitute therefore --almost--.

In the Specification, Column 4, line 26 of the Patent, delete "elinated"; substitute therefore --eliminated--.

In the Specification, Column 4, line 28 of the Patent, delete "minized"; substitute therefore --minimized--.

In the Specification, Column 4, line 28 of the Patent, delete "elinated"; substitute therefore --eliminated--.

UNITED STATES PATENT AND TRADEMARK OFFICE
CERTIFICATE OF CORRECTION

PATENT NO. : 4,681,823          Page 3 of 4
DATED     : July 21, 1987
INVENTOR(S) : Tung et al.

It is certified that error appears in the above-identified patent and that said Letters Patent is hereby corrected as shown below:

In the Specification, Column 4, line 48 of the Patent, delete "te"; substitute therefore --time--.

In the Specification, Column 4, line 48 of the Patent, delete "noral"; substitute therefore --normal--.

In the Specification, Column 5, line 3 of the Patent, after "a"; insert  -- monel --.

In the Specification, Column 5, line 9 of the Patent, delete "as"; substitute therefore --gas--.

In the Specification, Column 5, lines 21 and 22 of the Patent, delete "Teper-ature"; substitute therefore --Temperature--.

In the Specification, Column 5, line 39 of the Patent, delete "A Five"; substitute therefore --Five--.

In the Specification, Column 5, line 45 of the Patent, delete "radually"; substitute therefore --gradually--.

In the Specification, Column 5, line 49 of the Patent, delete "approxately"; substitute therefore --approximately--.

In the Specification, Column 6, line 3 of the Patent, delete "ws"; substitute therefore --was--.

In the Specification, Column 6, line 11 of the Patent, delete "ately"; substitute therefore --approximately--.

UNITED STATES PATENT AND TRADEMARK OFFICE
CERTIFICATE OF CORRECTION

PATENT NO. : 4,681,823

DATED : July 21, 1987

INVENTOR(S) : Tung et al.

It is certified that error appears in the above-identified patent and that said Letters Patent is hereby corrected as shown below:

In the Specification, Column 6, line 20 of the Patent, delete "xvalue"; substitute therefore --x-value--.

In the Specification, Column 6, line 44 of the Patent, delete "aount"; substitute therefore --amount--.

In the Claims, Column 6, line 62 of the Patent, delete "foring"; substitute therefore --forming--.

In the Claims, Column 8, line 2 of the Patent, delete "teperature"; substitute therefore --temperature--.

Signed and Sealed this

Fifth Day of January, 1988

Attest:

DONALD J. QUIGG

Attesting Officer

Commissioner of Patents and Trademarks